United States Patent [19]

Hoffmann et al.

[11] 3,904,259

[45] Sept. 9, 1975

[54] MAGNETIC TAPE CASSETTE STORAGE CONTAINERS

[75] Inventors: William F. Hoffmann; Walter A. Blissell, Jr., both of Seattle, Wash.

[73] Assignee: The Boeing Company, Seattle, Wash.

[22] Filed: Feb. 22, 1974

[21] Appl. No.: 444,910

[52] U.S. Cl. ........ 312/111; 206/DIG. 36; 220/31 S; 220/60 R; 312/199; 312/319

[51] Int. Cl.[2] .................... E05B 73/00; B65D 39/00

[58] Field of Search ......... 206/DIG. 36; 312/14, 15, 312/107–111, 198, 199, 319; 220/31 S, 60 R, 315; 211/40

[56] References Cited

UNITED STATES PATENTS

| | | | |
|---|---|---|---|
| 3,272,325 | 9/1966 | Schoenmakers | 206/DIG. 36 |
| 3,287,075 | 11/1966 | Batke et al. | 312/108 |
| 3,514,170 | 5/1970 | Shewchuk | 312/107 |
| 3,567,298 | 3/1971 | Ambaum et al. | 312/111 |
| 3,595,433 | 7/1971 | Jones | 220/31 S |
| 3,603,478 | 9/1972 | Connan | 312/319 UX |
| 3,635,350 | 1/1972 | Wolf | 211/40 |
| 3,642,337 | 2/1972 | Manheim | 312/111 |
| 3,684,124 | 8/1972 | Song | 220/60 R |
| 3,710,900 | 1/1973 | Fink | 206/DIG. 36 |

*Primary Examiner*—Casmir A. Nunberg
*Attorney, Agent, or Firm*—Christensen, O'Connor, Garrison & Havelka

[57] ABSTRACT

Containers suitable for storing magnetic tape cassettes in a manner such that each cassette is entirely enclosed in an individual compartment and, thus, protected from dirt, dust and the like are disclosed. In the one form, each container forms an individual compartment. In an alternate form each container houses a plurality of compartments. In either event, the containers can be interlocked together to form a housing for storing a tape cassette library, the housing having the ability to expand as the library is expanded. Each compartment includes a door, ejection spring and a plurality of guide rails. Preferably, the door is a drop-down door and is latched closed by a fingernail operated latch. When the door is open, the ejection spring moves the cassette housed therein outwardly by an amount adequate to allow the cassette to be grasped by the fingers of the person desiring the cassette.

47 Claims, 16 Drawing Figures

MAGNETIC TAPE CASSETTE STORAGE CONTAINERS

BACKGROUND OF THE INVENTION

This invention is directed to storage containers and more particularly to storage containers for storing magnetic tape cassettes.

A wide variety of storage containers for storing magnetic tape cassettes have been proposed by the prior art. For various reasons, the prior art proposals have been found to be unsatisfactory and, thus, have not found widespread consumer acceptance. For example, many prior art storage containers for storing magnetic tape cassettes store a plurality of cassettes in a common compartment. The communication between cassettes allowed by such containers results in dust, dirt and the like flowing from one cassette to other cassettes during storage. Moreover, opening such containers to retrieve one cassette allows dirt, dust and the like to flow into the container and impinge on the other cassettes located therein. The storage container described in U.S. Pat. No. 3,603,478 entitled "Tape Cassette Holder" is an example of a container for magnetic tape cartridges having this type of disadvantage.

Other proposed magnetic tape cassette storage containers have the even greater disadvantage that the cassettes are always exposed to dust, dirt, and the like. Examples of such storage containers are described in U.S. Pat. No. 3,635,350 entitled "Snap-in Rack for Cassettes" and U.S. Pat. No. 3,677,396 entitled "Storage Box For Tape-Containing Cassettes and the Like." It will be appreciated that dirt, dust and the like acts to destroy the sound quality of the sound recorded on the cassette via the tape access opening or through the tape reel access openings.

Another major disadvantage of many prior art magnetic tape cassette storage containers relates to their inability to be expanded as needed to store additional cassettes. Examples of such containers are described in U.S. Pat. No. 3,272,325 (entitled "Storage Case For a Tape Cartridge"), U.S. Pat. No. 3,532,211 (entitled "Storage Case Tape Cartridge"), and U.S. Pat. No. 3,587,841 (entitled "Cassette Packaging"). While the containers described in these patents entirely encase individual cassettes, the containers, if stored, must be stored in other main housings. Such a double storage arrangement requires that the containers first be removed from the main housing prior to the cassette being removed from the container. Thus, a two-step access and return to storage procedure is required to use such cassette storage systems.

Another disadvantage of many prior art systems for storing magnetic tape cassettes is the difficulty in removing individual cassettes. More specifically, many prior art systems mount the cassettes in side-by-side relationship. Thus, the outer surfaces of the "retrieval" side of the cassettes define a plane. The difficulty with such systems arises when it is desired to remove a single cassette without disturbing the cassettes on either side of the one to be removed.

In addition to the foregoing disadvantages, prior art storage containers for storing magnetic tape cassettes have other disadvantages. For example, in many cases, there is no means for identifying individual cassettes either before or after an individual tape cassette access door is opened, if such access door exists at all.

While the cassette container described in U.S. Pat. No. 3,642,337 entitled "Cassette Container" overcomes some of the disadvantages noted above, it has other disadvantages. Specifically, this patent describes a container wherein separate drawers are included for each individual cassette. Thus the individual cassettes are protected from dirt, dust and the like present on cassettes or in other cassette drawers. However, a relatively complicated drawer structure is proposed for achieving this result. Moreover, the drawers appear to have removal problems. That is, the drawers are substantially the thickness of a tape cassette. Thus, their withdrawal by individuals with relatively thick fingers may be somewhat difficult.

As can be seen from the foregoing brief discussion of the disadvantages of prior art cassette containers, users must choose which of the functional inadequacies of the containers is least annoying to them when buying storage containers for their cassettes. This invention is directed to alleviating this general problem by providing storage containers for storing magnetic tape cassettes which maintain all of the advantages of prior art storage containers, include additional advantages, and eliminate most of the disadvantages.

Therefore, it is an object of this invention to provide a new and improved storage container for storing magnetic tape cassettes.

It is a further object of this invention to provide new and improved storage containers for storing magnetic tape cassettes which maintains each cassette in an individual enclosed compartment to thereby protect each individual cassette from dirt, dust and the like during storage.

It is another object of this invention to provide new and improved magnetic tape cassette storage containers which can be readily expanded as additional cassettes are accumulated.

It is a still further object of this invention to provide new and improved magnetic tape cassettes storage containers which can be sold along with the cassettes and integrated into an overall housing for storing a tape cassette library.

It is yet a further object of this invention to provide magnetic tape cassette storage containers wherein individual cassettes can be readily removed without difficulty, as desired.

SUMMARY OF THE INVENTION

In accordance with principles of this invention, magnetic tape cassette storage containers suitable for storing individual magnetic tape cassettes in a manner such that each cassette is entirely enclosed and, thus, protected from dirt, dust and the like is provided. The containers are formed such that they can be interlocked together to form a housing for storing a tape cassette library, the housing having the ability to grow as the library is expanded. Each compartment includes a door and an ejection spring. Preferably, the door is a drop-down door and is latched closed by a finger or fingernail operated latch. When the door is opened, the ejection spring moves the cassette housed therein outwardly by an amount adequate to allow the cassette to be easily grapsed by the fingers of the person desiring the cassette.

In accordance with other principles of this invention, in one form, each container forms an individual compartment. In an alternate form, each container houses a plurality of compartments. In either form, the containers can be interlocked together to form a tape cassette library housing.

In accordance with further principles of this invention, the containers are formed of plastic molded into a rigid structure, and the door is transparent. The door includes means for holding a tape identification slip or the like. Further, a plurality of guide rails are integrally formed in the interior of the container compartment or compartments to maintain the tape cassette or cassettes in predetermined positions in the container.

In accordance with still further principles of this invention, the means for interlocking the containers together comprises a dovetail arrangement for maintaining the adjacent containers in predetermined positions and buttons and dimples for locking the containers in the predetermined positions. In addition, if desired, a container or containers for housing a plurality of cassettes in individual compartments may be mounted in a further supporting structure.

In accordance with yet other principles of this invention, containers for storing a plurality of magnetic tape cassettes in individual compartments also include handles formed in their associated dovetail regions. In addition, a lock strip with an integral handle is provided for locking a plurality of such containers together to form an overall library housing having expansion capabilities.

It will be appreciated from the foregoing brief summary that the invention provides containers suitable for storing individual magnetic tape cassettes that overcome the prior art disadvantages described above. Specifically, the containers are formed such that individual compartments are provided that entirely enclose each cassette during storage. In addition, the containers can be expanded as the tape library of the user expands. Further, the containers can be formed such that they can be sold on an individual basis along with magnetic tape cassettes. Thereafter, they can be integrated into an overall system to form part of a housing for storing a tape cassette library. Moreover, the invention provides a means for ejecting a cassette when desired so as to allow such a cassette to be readily removed from its associated compartment.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings wherein.

DESCRIPTION OF THE PREFERRED EMBODIMENT

Figure 1:
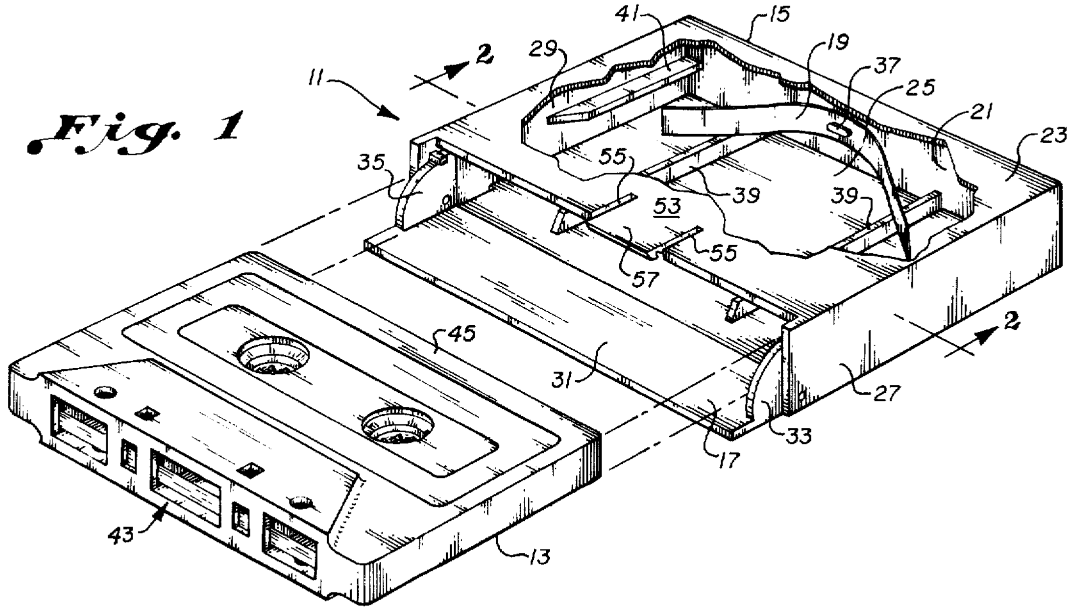
FIG. 1 is a perspective view, partially broken away, illustrating an individual container formed in accordance with the invention for storing a magnetic tape cassette.
Figure 2:
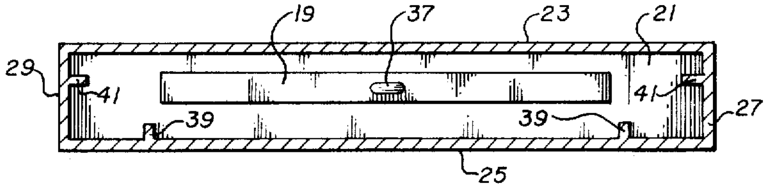
FIG. 2 is a cross-sectional view along line 2—2 of FIG. 1.

FIG. 1 illustrates a container 11 which defines a compartment suitable for storing a single magnetic tape cassette 13. The container 11 generally comprises a case 15, a door 17 and an ejection spring 19. The case 15 includes a rear wall 21, a top wall 23, a bottom wall 25 and two end walls 27 and 29. (As used herein the terms "top," "bottom" and "end" with respect to the various walls relate to the drawing orientation and are used for descriptive purposes. These terms are not to be construed as limiting since the inventive containers can be oriented in a variety of manners other than those shown—with the door on top, rather than in front, for example.) The door 17 includes a door panel 31 and two hinge panels 33 and 35, one located on either end. The ejection spring 19 is a generally U-shaped leaf spring having outwardly diverging arms. The center of the ejection spring 19 is attached by an elongated projection 37 to the center of the rear wall 21. Preferably, the case 15 and the door 17 are formed of a suitable plastic and the ejection spring is formed of a suitable metal.

The top and bottom walls 23 and 25 are parallel to one another and the end walls 27 and 29 are parallel to one another. Preferably, the back wall, the top and bottom walls, and the end walls are integrally formed together. Thus, the walls define an integrally formed rectangular parallelepiped compartment having an open front whereat the door 17 is located. In addition, integrally formed in the bottom wall 25 and projecting inwardly into the thusly defined compartment are two parallel guide rails 39. Further, integrally formed with each of the end walls 27 and 29 and projecting inwardly into the compartment are two guide rails 41, one associated with each end wall.

Each of the two door hinge panels 33 and 35 defines an arc of approximately 90°, and forms a portion of the door hinge. The door panel 31 is rectangular in shape and adequate in size to enclose the open front of the compartment defined by the walls. The hinge panels are integrally formed on either end of the door panel and project into the compartment and lie adjacent to the end walls when the door is closed.

Figure 3:
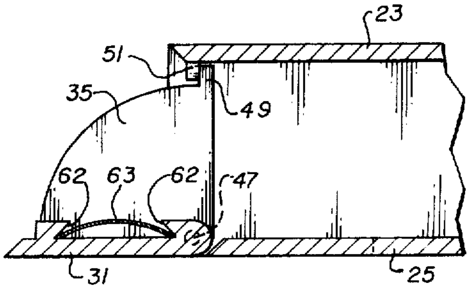
FIG. 3 is a cross-sectional view of a portion of a container of the type illustrated in FIG. 1 showing the door thereof in its fully opened position.
Figure 4:
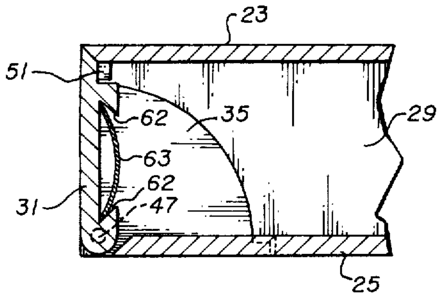
FIG. 4 is a cross-sectional view of the type illustrated in FIG. 3 showing the door in its closed position.

Located near the arc center of each of the side panels 33 and 35 are openings for hinge pins 47 which project inwardly from the adjacent regions of the end walls 27 and 29. In this manner, the hinges are rotatably attached to the end walls 27 and 29. Since the side panels are integrally formed with the door panel 31, the door panel 31 rotates between an open and a closed position as the hinge panels rotate. The open position is illustrated in FIG. 3 and the closed position is illustrated in FIG. 4.

Projecting outwardly from the edge of the side panels 33 and 35 remote from the edge of attachment to the door panel 31 are stop arms 49. The stop arms are adapted to impinge on pins 51 which project inwardly from points near the upper front corners of the end walls 27 and 29 when the door 17 is open, as illustrated in FIG. 3.

Figure 5:
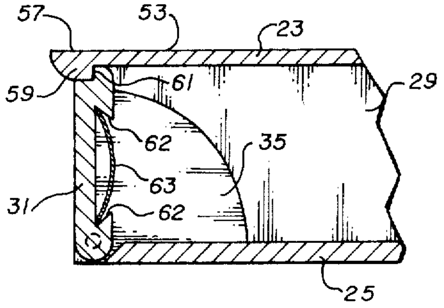
FIG. 5 is a partial cross-sectional view illustrating a latch mechanism for latching the door of a container of the type illustrated in FIG. 1.

The door 17 is locked closed by a latch mechanism 53. The latch mechanism comprises an arm 57 generally located in the centerfront edge of the top wall 23 and a receiving slot 61 correspondingly located in the top front edge of the door panel 31. The arm 57 is defined by a pair of parallel slots 55 which project rearwardly from the front edge of the top wall 23. As illustrated in FIG. 5 the front tip of the arm 57 projects slightly beyond the outer surface of the door panel 31 when the door 17 is closed. In any event the front tip of the arm 57 includes a downwardly projecting portion 59 which coacts with the receiving slot 61 formed in the door panel 31. The receiving slot 61, as viewed in FIG. 5, is formed by the removal of a portion of the front top edge of the door panel 31. Alternatively, the downwardly projecting portion 59 could rest directly against the front surface of the door panel 31, i.e., the receiving slot can be eliminated. In any event, the parallel slots 55 allow the arm 57 to be raised upwardly to remove impingement between the projecting portion 59 of the arm 57 and the door panel 31. When this action occurs, the door 17 swings to the position illustrated in FIG. 3.

Preferably, the door 17 is formed of a transparent plastic material and includes a longitudinal dovetail groove 62 on its inner surface. The dovetail groove 62 allows a suitable identification label 63 to be held therein and viewed through the front panel 31. More specifically, the dovetail groove 62 has a relatively wide base and a relatively narrow opening as seen in FIGS. 3, 4 and 5 and runs parallel to the longitudinal axis of the door 17. During insertion, the label 63 is flexed and then inserted into the dovetail groove 61. Thereafter, because of its shape, the dovetail groove "holds" the identification label.

The cassette 13 is inserted into the container 11 such that its tape access opening 43 lies adjacent to the open front of the container. The other or rear edge 45 of the cassette 13 compresses the ejection spring 19 by pressing it toward the rear wall 21 when the door 17 is closed and latched in the manner described above. The lower surface of the cassette 13 rests on the guide rails 39 formed in the bottom wall 25, and the cassette lies between the guide rails 41 formed in the end walls 27 and 29. In addition, the cassette during insertion and removal passes between the two hinge panels 33 and 35 forming part of the door 17.

As well as being suitable for individual sale, magnetic cassette storage containers of the type described above, are also suitable for sale along with the cassettes they house. When sold in this manner they provide a container adapted to protect their related cassette from dirt, dust and the like during shipping, shelf storage, etc. If desired, suitable, compressible means (not shown) can be provided to prevent rotation of the cassette reels during shipping, shelf storage, etc. Such compressible means will be located such that the means coact with the cassette reels when the cassette is positioned within the container and the door is closed, and may comprise foam rubber, nylon bristles, etc. The compressible means may be mounted such that it can be removed and disposed of subsequent to the transfer of the cassette and container to the user, thereof. Alternatively, the compressible material can be permanently affixed inside of the container and perform its function during the entire life of the container. Alternatively to such compressible means, a disposable cardboard section with foldable projections can be utilized to prevent reel rotation during shipping, shelf storage, etc. Such as cardboard can be combined with or project rearwardly from the identification slip 63, if desired.

Figure 6:
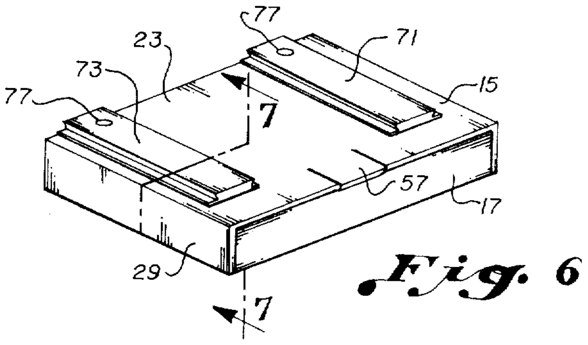
FIG. 6 is a perspective view illustrating a means for interlocking individual containers of the type illustrated in FIG. 1.
Figure 7:
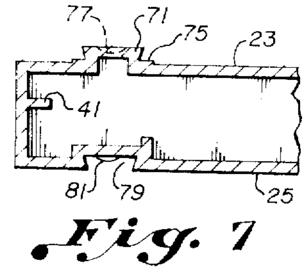
FIG. 7 is a partial cross-sectional view along line 7—7 of FIG. 6.

In addition to the feature illustrated in FIGS. 1–5, preferably, a container 11 of the type heretofore described also includes means for interlocking several of such containers together in order to form a housing suitable for storing a plurality of tape cassettes (a tape library). FIGS. 6 and 7 illustrate a preferred means, integrally formed with the container, to achieve this desired result. Specifically, FIG. 6 illustrates the case 15 and the door 17 in a closed position. Formed in the top wall 23 of the case 15 are two dovetail projections 71 and 73. The dovetail projections lie along longitudinal axes that are parallel to the ends 27 and 29 of the container 15. One of the dovetail projections is located between the latch 57 and one end wall, and the other is located between the latch 57 and the other end wall. The dovetail projections, as best seen in FIG. 7 are raised above the upper surface of the top wall 23 by the thickness of a boss region 75. In addition, located near the rear end of each dovetail projection 71 and 73 is a semi-spherical indentation or dimple 77.

Formed in the lower surface 25, along axes generally parallel to the axes defined by the dovetail projections, are dovetail apertures 79, only one of which is shown in FIG. 7. The dovetail apertures are sized such that the dovetail projections can be slid therein. The dovetail apertures 79 include semi-spherical buttons 81 located near their rear ends. The buttons 81 are located such that when the dovetail projections of one container are "slid" into the dovetail apertures of another container, and the containers are stacked in alignment, the buttons 81 fit into the dimples 77 and lock the containers in their stacked, aligned positions.

The foregoing dovetail/button-dimple structure allows a plurality of containers, each suitable for housing an individual magnetic tape cassette, to be stacked one on top of another. In this manner an overall housing suitable for storing a library of tape cassettes is formed. Obviously, the location of the dovetail projections and dovetail apertures can be reversed, if desired; that is, the projections in the bottom and the apertures in the top.

While interlocking a plurality of containers of the type illustrated in FIG. 1 together using the structure illustrated in FIGS. 6 and 7, allows a satisfactory library housing to be formed when the number of cassettes is relatively small, i.e., 6–12, for example, it does not allow a satisfactory library housing to be formed when the number of cassettes is relatively large because the resultant structure lacks stability. The invention overcomes this stability problem by, as illustrated in FIG. 8, providing an encompassing structure 83.

Figures 8, 9:
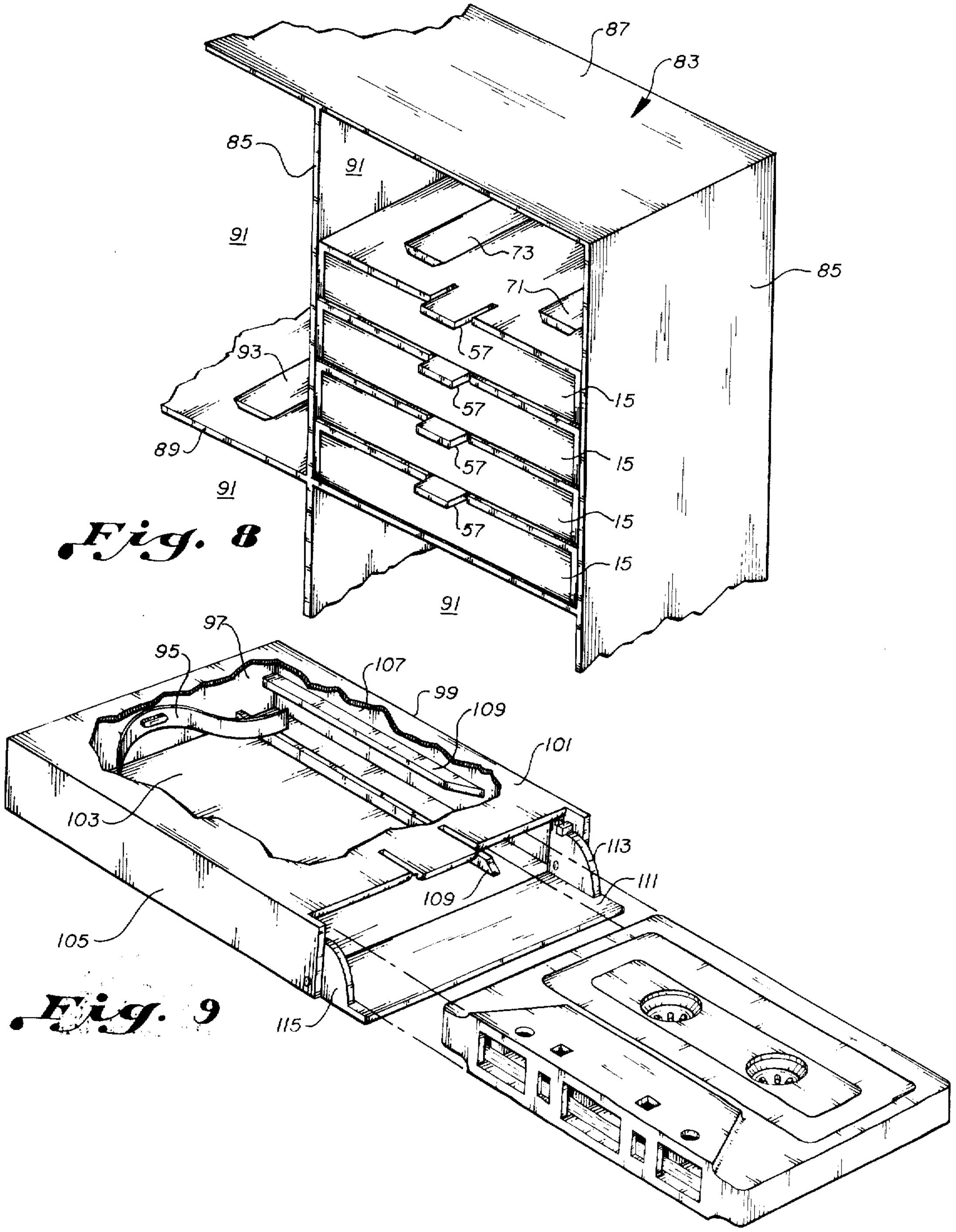
FIG. 8 is a perspective view illustrating a plurality of containers of the type illustrated in FIG. 6 mounted in a support structure.
FIG. 9 is a perspective view illustrating an alternate individual container for magnetic tape cassettes formed in accordance with the invention.

The encompassing structure 83 comprises a plurality of vertical walls 85, a top wall 87, a bottom wall (not shown), a plurality of shelves 89, and a back wall (also not shown) in FIG. 8. The shelves, vertical walls, top, bottom and back walls are integrally formed or connected together in a manner such that they define a plurality of rectangular parallelepiped chambers 91. The chambers 91 are open in front and are sized such that a predetermined number (such as 6, for example) of containers can be stacked together, in the manner previously described, in each chamber. In order to "lock" the stacked containers in the chambers 91, two parallel dovetail projections 93 project upwardly from the "floor" of each chamber. The chamber dovetail projections 93 are formed and arrayed such that they coact with the dovetail apertures 79 formed in the bottom wall 25 of the bottom container 11 of the stack of containers housed in the associated chamber 91. Located near the rear of each chamber dovetail projection 93 is a dimple (not viewable in FIG. 8), similar to the dimple 77 formed in the container dovetail projections, which receives the button 81 located in the dovetail apertures 79 of the "bottom" container. In this manner, not only are the containers 11 locked together, but they are also locked in their associated chamber 91.

It will be appreciated from the foregoing description of the chambered encompassing structure 83, that it, in combination with a plurality of containers 11, provides a housing suitable for storing a relatively large tape cassette library. It should be noted that each individual tape cassette is housed in a fully enclosed, separate compartment. Because the cassette compartments are separated from one another dirt, dust and the like existing in one compartment cannot migrate into other compartments, particularly during removal and return of cassettes. Moreover, each cassette is easily and readily available. All that needs to be done by a user to obtain a particular cassette is for him to raise the latch 57 of the container housing the desired cassette. When this action occurs, the associated door 17 swings down and the cassette is pushed outwardly by the action of the ejection spring 19. To replace the cassette all the user needs to do is open the correct container door, push the cassette into the container against the force of the associated ejection spring 19, and close the door until it latches. Cassette contents are easily identified because each container is separately identified by the identification label mounted in its associated door 17 in the manner described above.

While, preferably, the containers 11 are formed such that the cassettes are oriented with their tape access opening lying adjacent to the door, this orientation can be varied, if desired. For example, the cassettes can be rotated 180° if desired, so that their tape access openings face the rear wall. Obviously, in this case, the ejection spring must be formed in a manner such that it doesn't impinge on the tape. Alternatively, the containers 11 can be formed such that the cassettes are merely rotated by 90° as illustrated in FIG. 9.

The container illustrated in FIG. 9 has the same basic configuration as the containers described above in that it includes an ejection spring 95 affixed to the rear wall 97 of a case 99 which also includes an integral top wall 101, bottom wall 103 and end walls 105 and 107. Further, a plurality of guide rails 109 integrally formed in the bottom and end walls of the case 99 are included. In addition, a downwardly folding door 111, including hinge panels 113 and 115 are adapted to close the front opening into the interior of the case 99, is included. Finally, door stops and an identical latch means are also included. Moreover, even though not illustrated, suitable dovetail assembly means of the type illustrated in FIGS. 6 and 7 are included. Thus, the FIG. 1 and FIG. 9 containers are identical except for a length/width change.

It should be noted at this point that while the containers are illustrated and described herein as adapted to maintain the cassettes stored therein in horizontal planes, the containers could be rotated 90° so as to store the cassettes in vertical planes, if desired.

Figure 10:
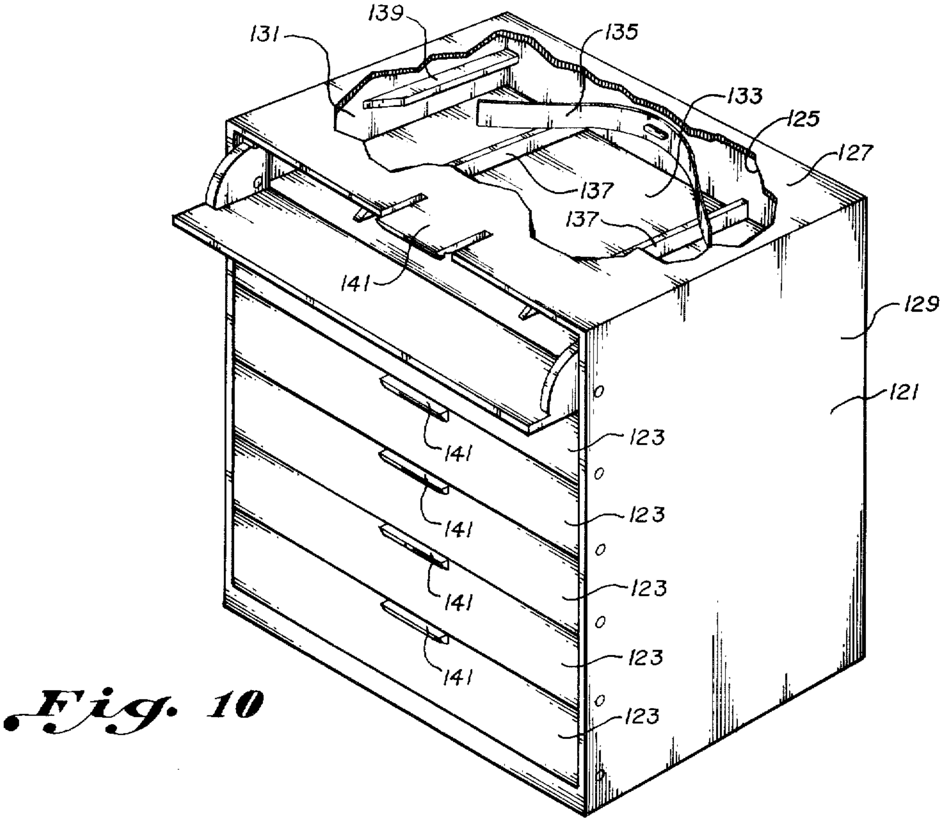
FIG. 10 is a perspective view illustrating a magnetic tape cassette container formed in accordance with the invention for housing a plurality of cassettes in individual compartments.

While containers of the type illustrated in FIGS. 1 and 9 are suitable for assembly into a cassette library housing, in some cases, it may be desirable to provide a single container having the same benefits. Such a container, for example, is useful to store a library of cassettes already owned by a particular user. FIG. 10 illustrated a container formed in accordance with the invention that accomplishes this result.

FIG. 10 illustrates a multiple chamber container 121 housing a plurality of separated compartments. The interior of each compartment is accessible via a door 123. More specifically, the multiple chamber container 121 includes a back wall 125, a top wall 127, a bottom wall (not viewable) and two side walls 129 and 131. In addition, a plurality of horizontal separating shelves 133 are included. The separating shelves separate the overall container into a plurality of compartments each similar to the compartment formed by the case 15 illustrated in FIG. 1 and described above. Each compartment includes an ejection spring 135 affixed to the back wall 125. In addition, two guide rails 137 project upwardly into each compartment from each shelf, and two guide rails 139 (one on either side) project inwardly into each compartment from the side walls.

Each of the doors 123 is substantially identical to the door 17 illustrated in FIG. 1. The doors are rotatable between a horizontal open position and a vertical closed position. Latches 141 similar to the latch 57 illustrated in FIG. 5 maintain the doors closed. Thus, the multiple chamber container illustrated in FIG. 10 is substantially identical to a structure comprised of a plurality of individual containers stacked together.

While multiple chamber containers 121 of the type illustrated in FIG. 10 are suitable for housing a plurality of magnetic tape cassettes, their capacity may be insufficient to house an entire cassette library and thus, a plurality of such containers may be necessary. If desired, such a plurality of containers 121 can be mounted in a support structure 143 of the type illustrated in FIG. 11.

Figure 11:
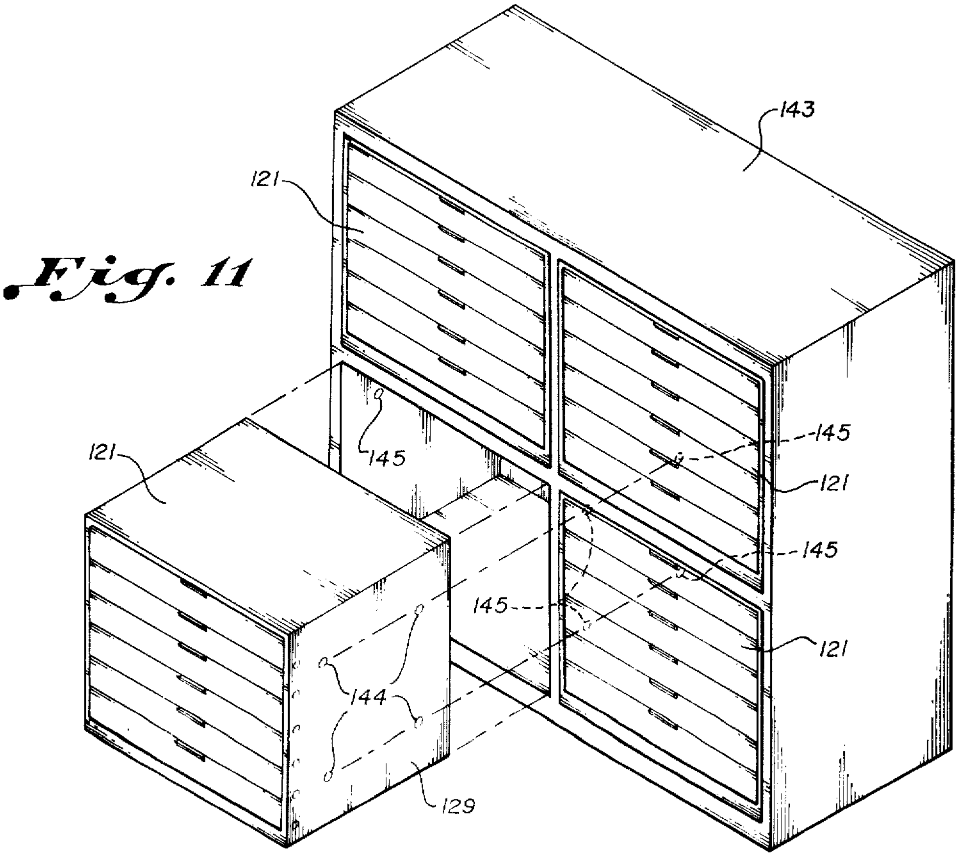
FIG. 11 is a perspective view of a support structure for housing a plurality of magnetic tape cassette containers of the type illustrated in FIG. 10.

The support structure 143 illustrated in FIG. 11 is generally similar to the chambered encompassing structure 83 illustrated in FIG. 8 in that it includes a plurality of chambers separated from one another by vertical walls and shelves, plus, top, bottom, rear and side walls. Each chamber is sized so as to receive a container 121 of the type illustrated in FIG. 10. If desired, locking is provided by a plurality of dimples 143 formed in each side wall 129 of each of the containers 121 and corresponding buttons 145 formed in the side walls defining each chamber of the overall housing 143.

Figures 12, 15:
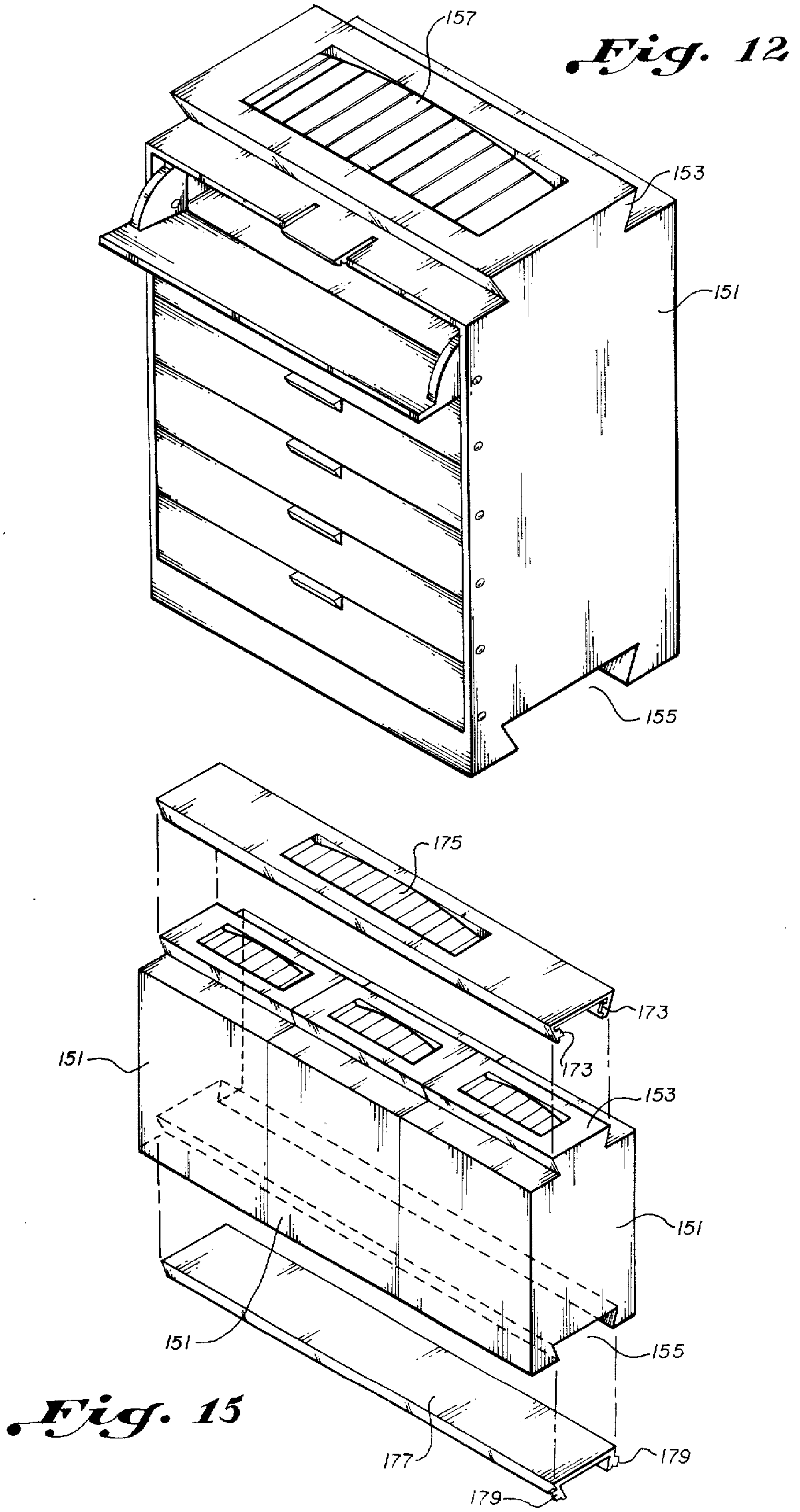
FIG. 12 is a perspective view of an alternate form of a magnetic tape cassette container formed in accordance with the invention for storing a plurality of cassettes in individual compartments.
FIG. 15 is a perspective view of containers of the type illustrated in FIG. 12 assembled together to form a transportable tape cassette library; and, FIG. 16 is a perspective view, partially broken away, of a further embodiment of an individual magnetic tape cassette storage container formed in accordance with the invention.

In some instances, it may be desirable to interconnect a plurality of multiple compartment containers directly together without requiring the use of a separate chambered housing. FIG. 12 illustrates a compartmented container 151 including means for accomplishing this result. More specifically, projecting upwardly from the compartmented container 151 illustrated in FIG. 12 is a dovetail projection 153 and formed in the bottom of the compartmented chamber 151 is a dovetail aperture 155. The longitudinal axes defined by both the dovetail projection 153 and the dovetail aperture 155 lie parallel to one another, and parallel to the front face of the compartmented container 151.

Figure 13:
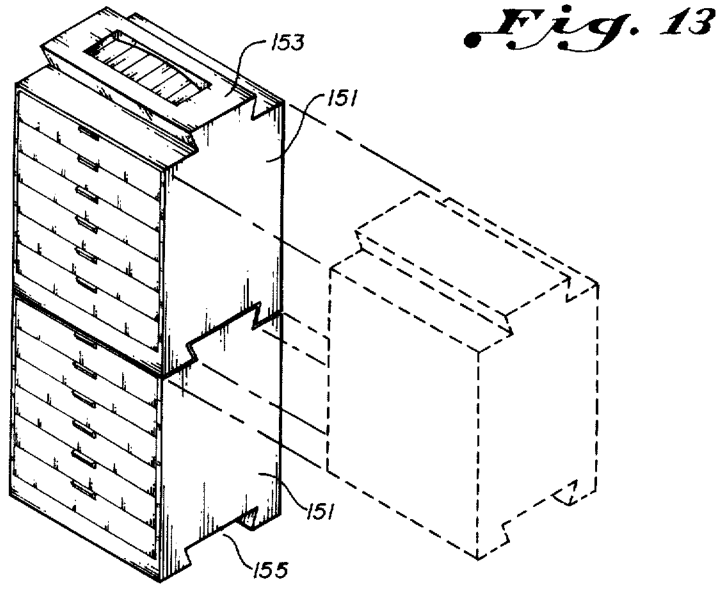
FIG. 13 is a perspective view illustrating two containers of the type illustrated in FIG. 12 assembled together.

The dovetail projections 153 and the dovetail apertures 155 are formed such that the plurality of compartmented chambers 151 can be interconnected together in the manner illustrated in FIG. 13. That is, the compartmented containers 151 can be stacked together by inserting a dovetail projection of one container into a dovetail aperture in another container. Preferably, although not shown, locking buttons and dimples of the type described above are provided to lock the thusly assembled containers together. In this manner, an expandable housing suitable for storing an expanding tape cassette library is provided.

Figure 14:
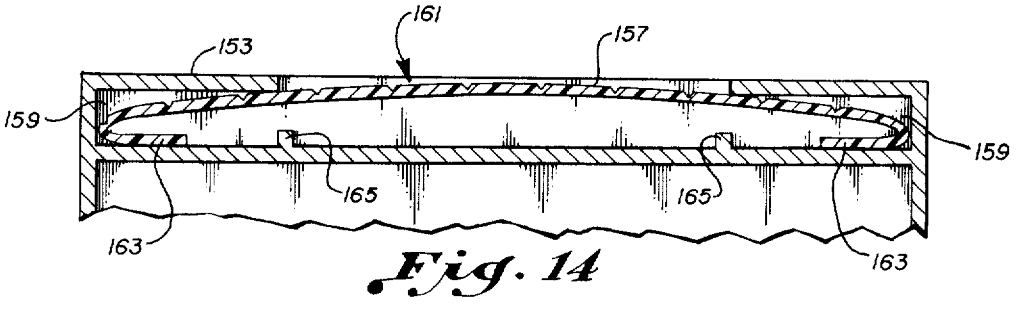
FIG. 14 is a cross-sectional view illustrating the transportation handle forming a portion of containers of the type illustrated in FIG. 12.

In order to be able to carry one or more compartmented containers of the type illustrated in FIG. 12 from one location to another location, collapsible handles 157 are formed in the top of the dovetail projections 153. The collapsible handles are preferably formed of straps which can be extended outwardly so as to be gripped. As illustrated in FIG. 14, the ends of the straps are retained in chambers 159 formed in either end of an access opening 161 formed in the top of the dovetail projection 153. The ends 163 of the strap 157 curve back upon the main part of the strap and lie in the chambers 159. Upward projections 165 prevent removal of the strap ends once they have been forced within the chambers 159.

In some instances, it may be desirable to affix a plurality of containers 151 of the type illustrated in FIG. 12 together in a side-by-side manner. FIG. 15 illustrates a plurality of such chambers mounted in such a relationship. In addition, FIG. 15 illustrates a coupling device for maintaining such containers in this relationship. More specifically, the coupling device comprises an upper lock strip 171 and a lower lock strip 177. The upper lock strip is formed of sheet metal or plastic and is dovetail in cross-section. The upper lock strip, thus, includes a dovetail aperture. The dovetail projections 153 of the containers 151 lie within the dovetail aperture of the upper lock strip and lock tabs 173 located on the ends of the upper lock strip 171 prevent lateral movement of the containers. Preferably, the locking tabs are formed such that they can be bent inwardly about the ends of the dovetail projections 153 after the upper lock strip has been installed.

In addition to locking the chambered containers 151 together in a side-by-side manner, the upper lock strip also provides a means for carrying the thusly interconnected containers. The means for carrying the containers comprises an integral handle 175 formed generally similar to the handles 157 formed in the dovetail projections 153 of the chambered containers 151.

The lower lock strip 177 is also preferably formed of plastic or sheet metal and is dovetail shaped in cross-section. The dovetail shape is such that the lower lock strip is adapted to lie in the dovetail aperture 155 formed in the bottom of each of the chambered containers 151. The lower lock strip 177 also includes bendable lock tabs 179 located on either end. The lock tabs are bent outwardly after the lower lock strip is inserted into the dovetail apertures 155 to further prevent lateral movement of the containers.

Figure 16:
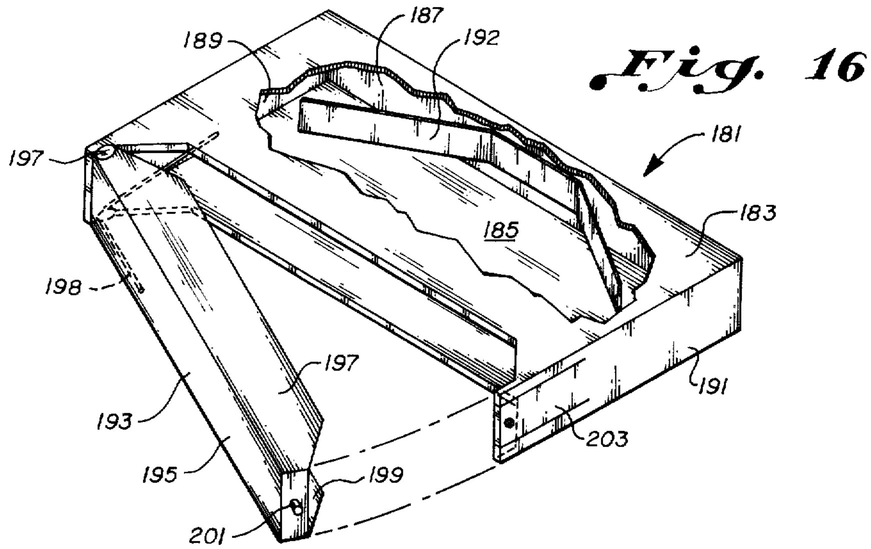

FIG. 16 illustrates an alternative embodiment of a container 181 suitable for housing a single tape cassette. The container 181 illustrated in FIG. 16 comprises a case including a top wall 183, a bottom wall 185, a rear wall 187 and end walls 189 and 191. All of the walls are integrally formed in a manner such that the top and bottom walls 181 and 185 are parallel to one another and the end walls 189 and 191 are parallel to one another. Thus, the walls define a chamber. Although not shown, guide rails for guiding a cassette during insertion may be provided inside of the container 181. In any event, a diverging ejection spring 192 is illustrated as affixed to the rear wall 187.

The top and bottom walls 183 and 185 are formed such that a generally trapezoidal shaped region is formed in their "front" edges. A door 193 which includes corresponding top and bottom trapezoidal panels which lie in these regions when the door is closed, is also provided. An outer panel 195 connects the top and bottom trapezoidal panels together and forms the face of the door 193. One end of the thusly formed door 193 is affixed by a suitable hinge mechanism 196 to one of the end walls 189. A wire coil spring 198 having outwardly extending arms, one of which presses against the "hinge" end wall and the other of which presses against the door, causes the door 193 to swing outwardly when it is unlatched in the manner hereinafter described.

The other end of the door includes a pin 201 which cooperates with a latch arm 203. The latch arm 203 forms a portion of the non-hinge end wall 191. The latch arm 203 is generally similar to the latch arm 57 illustrated in FIG. 1 in that it is integrally formed with its associated end wall 191, but is partially separated by a pair of parallel slots. The latch arm 203 includes a suitable aperture adapted to "grab" the pin 201 of the door 193. The latch arm 203 is moved outwardly when it is desired to release the door 193 by fingernail pressure or the like.

While only a single cassette container is illustrated in FIG. 16 it will be appreciated that the mechanism used therein is also useful in a container adapted to house a plurality of cassettes. In other words the door mechanism illustrated in FIG. 16 could be adapted for use with compartmented containers of the type described above. Alternatively, interlocking means (such as dovetail projections and apertures) can be included so that a plurality of containers of the type illustrated in FIG. 16 can be interlocked together to form an overall housing suitable for storing a tape cassette library. However, it should also be noted that the containers of the type illustrated in FIG. 16 have some disadvantages when compared with containers of the type previously described. Specifically, since the door is hinged at one end, rather than along the bottom, the hinging structure is less strong. Moreover, an additional spring for door opening is required. On the other hand, in some environments containers of the type illustrated in FIG. 16 may be more desirable than are containers of the type illustrated in FIG. 1.

It will be appreciated from the foregoing description that the invention provides containers suitable for storing magnetic tape cassettes. The containers can be constructed so as to store only one cassette and interlocked together to form an overall housing for storing a small tape cassette library. Such housings can be coupled together in a variety of manners to form a large housing suitable for storing medium and large size tape cassette libraries, if desired. Alternatively, a container having a plurality of entirely separate cassette compartments can be formed in accordance with the invention. Such containers can be individually used to store small tape cassette libraries or they can be connected together in a variety of manners to form a large housing suitable for storing a large tape cassette library. Hence, the invention is versatile. Moreover, it overcomes many of the prior art disadvantages described above. Specifically, since each cassette is stored in a compartment which entirely encloses that cassette, the migration of dust, dirt and the like from one compartment to another is prevented. In addition, the compartments are formed such that the removal or return of a single cassette does not allow dust, dirt or the like to enter the other compartments. The invention is formed such that physical embodiments thereof can be easily made using state of the art molding techniques. In addition, the invention provides means for readily displaying the nature of the cassettes contained in each compartment. Further, it provides a latching and hinging mechanism that is inexpensive to manufacture in that it can generally be readily formed in an integral manner with the overall structure.

While preferred embodiments of the invention have been illustrated and described, it will be appreciated by those skilled in the art and others that various changes can be made therein without departing from the spirit and scope of the invention. Hence, the invention can be practiced otherwise than as specifically described herein.

The embodiments of the invention in which exclusive property or privilege is claimed are defined as follows:

1. A magnetic tape cassette storage container for storing magnetic tape cassettes comprising:

a container housing at least one compartment defined by a solid top wall, a solid bottom wall, two solid end walls and a solid back wall, and having an open front wall, said top and bottom walls being spaced from one another by an amount slightly greater than the thickness of a tape cassette and said end walls being spaced from one another by an amount slightly greater than the width of a tape cassette, and said back wall being spaced from said open front by an amount slightly greater than the depth of a tape cassette;

compressible ejection means mounted in said at least one compartment for directing a magnetic tape cassette held in said one compartment toward said open front wall; and at least one solid door rotatably affixed to said container, adjacent to said open front wall of said at least one compartment, so as to be movable between an open position and a closed position, when in said open position, said at least one door allowing access to said at least one compartment such that a magnetic tape cassette can be inserted into said at least one compartment, when in said closed position, said at least one door closing said front wall of said compartment so as to press any cassette within said at least one compartment against said compressible ejection means and thereby compresses said ejection means, said container and said at least one door being formed such that said at least one compartment is entirely enclosed when said at least one door is in said closed position.

2. A magnetic tape cassette storage container as claimed in claim 1 wherein the walls defining said at least one compartment are formed of plastic and said top, bottom, end, and back walls are integrally formed with one another.

3. A magnetic tape cassette storage container as claimed in claim 2 including an interlocking mechanism associated with said container whereby a plurality of such containers can be interlocked together.

4. A magnetic tape cassette storage container as claimed in claim 3, wherein said interlocking mechanism comprises:

at least one dovetail projection integrally formed with, and projecting outwardly from, one of said top and bottom walls; and, at least one dovetail aperture integrally formed in the other of said top and bottom walls.

5. A magnetic tape cassette storage container as claimed in claim 3 wherein said interlocking mechanism comprises:

two dovetail projections integrally formed with, and projecting outwardly from, one of said top and bottom walls of said container, said dovetail projections being arrayed along parallel axes; and, two dovetail apertures integrally formed in the other of said top and bottom walls, said dovetail apertures being arrayed along parallel axes and located such that the dovetail projections of one container are adapted to be slid into the dovetail apertures of another container so as to interlock said containers together.

6. A magnetic tape cassette container as claimed in claim 5 including locking means forming a portion of said dovetail projections and said dovetail apertures for locking two adjacent containers together when the dovetail projections of one of said containers lie in the dovetail apertures of the other of said containers.

7. A magnetic tape cassette storage container as claimed in claim 6, wherein said locking means comprises at least one dimple formed in one of said dovetail projections and said dovetail apertures, and a button formed in the other of said dovetail projections and dovetail apertures.

8. A magnetic tape cassette storage container as claimed in claim 7, wherein said at least one door is rotatably attached to said container in a manner such that said door is hingedly attached to said end walls, adjacent to said bottom wall.

9. A magnetic tape cassette storage container as claimed in claim 8 including latch means for latching said at least one door in said closed position.

10. A magnetic tape cassette storage container as claimed in claim 9, wherein said latch means comprises an arm integrally formed in said top wall but separated from a portion thereof by two parallel slots lying along axes parallel to said end walls.

11. A magnetic tape cassette storage container as claimed in claim 10, wherein said compressible ejection means comprises a U-shaped leaf spring having diverging arms, the center of said leaf spring being affixed to said back wall.

12. A magnetic tape cassette storage container as claimed in claim 11 including a plurality of guide rails integrally formed in said bottom and end walls and projecting into said at least one compartment so as to define the location of a cassette within said at least one compartment.

13. A magnetic tape cassette storage container as claimed in claim 12 including stop means for preventing said at least one door from opening beyond a predetermined position.

14. A magnetic tape cassette storage container as claimed in claim 12, wherein said at least one door includes a panel having a holding means formed therein for holding an identification label.

15. A magnetic tape cassette storage container as claimed in claim 14 including housing means for housing a plurality of said containers.

16. A magnetic tape cassette storage container as claimed in claim 15 wherein said housing means defines a plurality of rectangular chambers, each of said chambers including a bottom wall and two dovetail projections formed in said bottom wall and arrayed along parallel axes, said dovetail projections being located such that the dovetail apertures of said container are adapted to slide onto said dovetail projections included in each of said chambers.

17. A magnetic tape cassette storage container as claimed in claim 1, wherein said at least one door is rotatably attached to said container in a manner such that said door is hingedly attached to said end walls, adjacent to said bottom wall.

18. A magnetic tape cassette storage container as claimed in claim 17 including latch means for latching said at least one door in said closed position.

19. A magnetic tape cassette storage container as claimed in claim 18, wherein said latch means comprises an arm integrally formed in said top wall but separated from a portion thereof by two parallel slots lying along axes parallel to said end walls.

20. A magnetic tape cassette storage container as claimed in claim 19 including stop means for preventing said at least one door from opening beyond a predetermined position.

21. A magnetic tape cassette storage container as claimed in claim 1, wherein said compressible ejection means comprises a U-shaped leaf spring having diverging arms, the center of said leaf spring being affixed to said back wall.

22. A magnetic tape cassette storage container as claimed in claim 1 including a plurality of guide rails integrally formed in said bottom and end walls and projecting into said at least one compartment so as to define the location of a cassette within said at least one compartment.

23. A magnetic tape cassette storage container as claimed in claim 1, wherein said at least one door includes a panel having means formed therein for holding an identification label.

24. A magnetic tape cassette storage container as claimed in claim 1, wherein:

said container houses a plurality of generally rectangular compartments, each of said compartments having a solid top wall, a solid bottom wall, solid end walls, a solid back wall, and an open front wall, the top wall of one compartment forming the bottom wall of its adjacent compartment, all of said solid walls being integrally formed together from plastic;

said compressible ejection means comprises a plurality of springs, one of said springs being mounted in each of said compartments for directing any magnetic tape cassettes held in said compartments toward the open front walls of said compartments;

a plurality of doors, one of said doors being associated with each of said plurality of generally rectangular compartments, each of said doors adapted to be moved between open and closed positions, when in said open position, said doors allowing access to their associated compartment such that a magnetic tape cassette can be inserted therein, when in said closed position said doors closing the front wall of their associated compartments so as to press any magnetic tape cassette held within said associated compartment against the spring associated with said compartment and thereby compresses said spring, said container and doors being formed such that when a particular door is closed, the compartment associated therewith is entirely enclosed.

25. A magnetic tape cassette storage container as claimed in claim 24 including an interlocking mechanism associated with said container whereby a plurality of such containers can be interlocked together.

26. A magnetic tape cassette storage container as claimed in claim 25 wherein said interlocking mechanism comprises:

at least one dovetail projection integrally formed with, and projecting outwardly from, the top of said container; and, at least one dovetail aperture integrally formed in the bottom of said container.

27. A magnetic tape cassette storage container as claimed in claim 26 including interlocking mechanism also includes means for interlocking a plurality of said containers together in side-by-side relationship.

28. A magnetic tape cassette storage container as claimed in claim 27, wherein said interlocking means comprises:

an upper lock strip including a dovetail aperture formed such that a plurality of dovetail projections formed in the tops of said containers can be slid therein; and, a lower lock strip having a dovetail outer configuration and formed in a manner such that said lower lock strip can be slid into a plurality of dovetail apertures formed in the bottoms of said containers.

29. A magnetic tape cassette storage container as claimed in claim 28 including a retractable handle formed in said upper lock strip.

30. A magnetic tape cassette storage container as claimed in claim 27, wherein each of said plurality of doors is rotatably attached to said container in a manner such that said door is hingedly attached to said end walls, adjacent to said bottom wall of its associated compartment.

31. A magnetic tape cassette storage container as claimed in claim 30 including a plurality of latches, each associated with one of said plurality of doors, for latching said plurality of doors in their closed positions.

32. A magnetic tape cassette storage container as claimed in claim 31 wherein said latches each comprises an arm integrally formed in the top wall of their associated compartments but separated from a portion thereof by two parallel slots lying along axes parallel to the end walls of their associated compartment.

33. A magnetic tape cassette storage container as claimed in claim 32, wherein said springs comprise U-shaped leaf spring having diverging arms, the center of each of said leaf springs being affixed to the back wall of its associated compartment.

34. A magnetic tape cassette storage container as claimed in claim 33 including a plurality of guide rails integrally formed in the bottom and end walls of each of said compartments and projecting into each of said compartments so as to define the location of cassettes within said compartment.

35. A magnetic tape cassette storage container as claimed in claim 34 including stop means associated with each of said plurality of doors for preventing said plurality of doors from opening beyond predetermined positions.

36. A magnetic tape cassette storage container as claimed in claim 35, wherein each of said plurality of doors includes a panel having a holding means formed therein for holding an identification label.

37. A magnetic tape cassette storage container for storing magnetic tape cassettes as claimed in claim 36 including housing means for housing a plurality of containers.

38. A magnetic tape cassette storage container as claimed in claim 37, wherein said housing means defines a plurality of chambers, each of said chambers including means for locking at least one container therein.

39. A magnetic tape cassette storage container as claimed in claim 24, wherein each of said plurality of doors is rotatably attached to said container in a manner such that said door is hingedly attached to said end walls, adjacent to said bottom wall of its associated compartment.

40. A magnetic tape cassette storage container as claimed in claim 39 including a plurality of latches, each associated with one of said plurality of doors, for latching said plurality of doors in their closed positions.

41. A magnetic tape cassette storage container as claimed in claim 40, wherein said latches each comprise an arm integrally formed in the top wall of their associated compartments but separated from a portion thereof by two parallel slots lying along axes parallel to the end walls of their associated compartment.

42. A magnetic tape cassette storage container as claimed in claim 41 including stop means associated with each of said plurality of doors for preventing said plurality of doors from opening beyond predetermined positions.

43. A magnetic tape cassette storage container as claimed in claim 42, wherein each of said plurality of doors includes a panel having a holding means formed therein for holding an identification label.

44. A magnetic tape cassette storage container as claimed in claim 24, wherein said springs comprise U-shaped leaf springs having diverging arms, the center of each of said leaf springs being affixed to the back wall of its associated compartment.

45. A magnetic tape cassette storage container as claimed in claim 24 including a plurality of guide rails integrally formed in the bottom and end walls of each of said compartments and projecting into each of said compartments so as to define the location of cassettes within said compartments.

46. A magnetic tape cassette storage container for storing magnetic tape cassettes as claimed in claim 24 including housing means for housing a plurality of containers.

47. A magnetic tape cassette storage container as claimed in claim 46, wherein said housing means defines a plurality of chambers, each of said chambers including means for locking at least one container therein.

* * * * *